United States Patent [19]
Beauregard

[11] 3,963,049
[45] June 15, 1976

[54] DUAL SEALING SOLENOID VALVE

[75] Inventor: William W. Beauregard, Agawam, Mass.

[73] Assignee: Springfield Wire, Inc., Springfield, Mass.

[22] Filed: Jan. 17, 1975

[21] Appl. No.: 542,070

[52] U.S. Cl. .................. 137/614.18; 137/614.19; 251/129; 251/210
[51] Int. Cl.² .................. F16K 31/06; F16K 25/00
[58] Field of Search ............ 137/614.18, 630.14, 137/614.19; 251/210, 129

[56] References Cited
UNITED STATES PATENTS
3,194,268  7/1965  Vicenzi et al. .............. 251/210 X FOREIGN PATENTS OR APPLICATIONS
1,387,267  12/1964  France .................. 137/614.18
15,939  6/1970  Japan .................. 137/614.18

Primary Examiner—Arnold Rosenthal

[57] ABSTRACT

A valve which has an outlet orifice, a solenoid including an armature and energizable coil, in which the armature is movable toward and away from said orifice in response to energizing and deenergizing the coil. The armature carries a first sealing member for sealing said orifice. A second sealing member movable out of sealing engagement about the periphery of said orifice in response to movement of said armature away from the orifice. The first and second sealing members are independently movable toward sealing engagement with the orifice. The valve also includes means independently urging the first and second sealing members into sealing engagement in and around the orifice.

4 Claims, 2 Drawing Figures

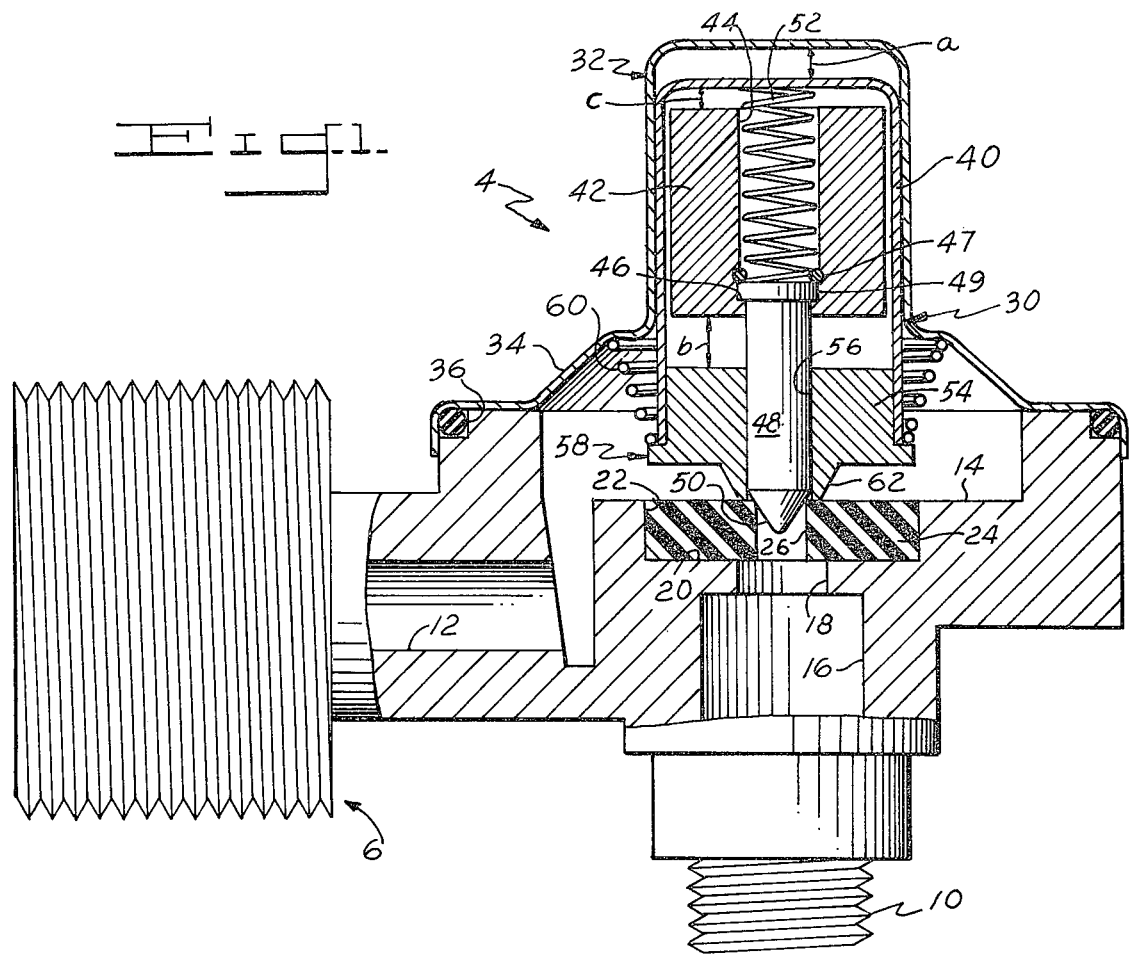

DUAL SEALING SOLENOID VALVE

BACKGROUND

The principal object of this invention is to provide a solenoid valve with two independently operable valve closure members whereby redundant sealing of the valve orifice is provided.

Further and other objects of this invention will be more readily apparent from the following disclosure and with reference to the accompanying drawings, in which:

FIG. 1 is a cross sectional elevational view showing a dual sealing solenoid valve embodying this invention; and FIG. 2 is a view similar to FIG. 1 in which the movable components thereof are shown in different operative relationship.

A fluid flow control valve embodying this invention is shown generally at 4 in the drawings and as shown is composed of a unitary body which may be molded of a suitable synthetic plastic material, such as nylon or the like. The valve includes a tubular inlet 6 suitably threaded for coupling to a water supply fitting. The valve body also includes a tubular outlet 10 also threaded for connection to a suitable appliance, such as an ice maker, to which water is to be supplied at a rate of flow controlled by the valve 4.

Bore 12 of the inlet 6 communicates with a valve chamber 14. An outlet bore or passage 16 also communicates with the valve chamber 14 through a reduced throat portion 18. The valve body includes a shoulder 20 facing into the valve chamber 14 and an annular rim 22 disposed about the periphery of the shoulder 20 so the shoulder is recessed. A resilient valve seat 24 is fitted snugly into this recess on the shoulder 20 and its outer edge seats against the rim 22. The valve seat member 24 includes an axial bore 26 in alignment with the outlet conduits 16 and 18 of the valve body. A closure member, shown generally at 30, is provided for controlling flow through the orifice 26 of the valve seat 24.

The closure member 30 is disposed within a generally cupshaped housing 32, which has a generally cylindrical upper portion and a downwardly and outwardly flared skirt 34. An electrical coil 33 (FIG. 2) is disposed about the housing 32. An O-ring 36 provides a sealing fit between the outer rim of the housing 32 and the body of the valve 4. A cylindrical cup or shell 40 is fitted within the cup-shaped housing 32 and is reciprocably movable therein toward and away from the resilient valve seat 24. The shell may be formed of any suitable noncorrosive material and may be a nonmagnetic metal or synthetic plastic. It has been found that stainless steel SST No. 304, .012 inch thick is suitable for the shell 40. Slidably disposed within the shell 40 is a ferromagnetic armature 42 which is preferably formed of a stainless steel, such as SST No. 434 or No. 430. A bore 44 is formed through the center of the armature 42 and includes an inwardly extending lip or shoulder portion 46 at its lower end.

A plunger 48 is fitted through the bore 44 in the armature 42 and includes a flange or enlarged head portion 49 held in place by a snap ring 47 so that the plunger 48 and armature 42 move back and forth as a unitary member. The plunger includes a cylindrical portion which extends downwardly from its head portion 49 and a conical tip 50 is provided at its lower end to fit in sealing relation within the orifice 26 in the valve seat member 24. A compression spring 52 is disposed within the bore 44 with its lower end seated against the head 49 of the plunger and its upper end seated against the inner surface of the top wall of shell 40. The spring 52 is compressed when the conical tip 50 is sealingly engaged with the orifice 26 of valve seat 24. Secured within the lower end portion of the shell 40 is a second reciprocable closure member 54 which may be formed of any suitable noncorrosive metallic, preferably nonmagnetic, or a synthetic plastic material. The member 54 also includes a central bore 56 disposed in generally coaxial alignment with the bore 44 so that the cylindrical portion of the plunger is vertically reciprocable within the bore 56 relative to the member 54. At its lower end the member 54 includes an outwardly extending flange 58 which forms an outwardly extending, upwardly facing shoulder adapted to receive the smaller diameter lower end of conically shaped compression spring 60. The larger diameter upper end of the coil spring is fitted against a flat land portion of the housing 32 so as to urge the member 54 downwardly toward the valve seat 24. At its lower extremity the member 54 includes a downwardly extending annular sealing rim 62 having a lower edge adapted to sealingly engage the upper surface of the resilient valve seat 24 circumferentially of the sealing engagement between the conical tip 50 and the valve seat 24.

Engagement between the conical tip 50 of plunger 48, urged by spring 52, and the upper inner edge of resilient valve seat 24 provides a sufficient sealing to prevent leakage of water from the chamber 14 to the outlet passages 18 and 16 of the valve. Additional sealing is provided by engagement between the lower edge of rim 62 urged by spring 60 and the upper surface of resilient seat 24. Each of these seals is independently obtained by separate and distinct application of forces by compression springs 52 and 60. From its sealing position in which the annular rim 62 is engaged with the valve seat 24, the length of the stroke of closure member 54 as it is carried by the armature 42 upon energization of the coil is shown at $a$ in FIG. 1. The distance $b$ provided between the lower surface of the armature 42 and the upper surface of member 54 is greater than the stroke $a$ of the closure member. Thus the tip 50 may be urged by spring 52 into sealing engagement with the orifice 26 even though closure member 54 is fully retracted. Thus if for any reason, such as a defective or broken spring 60 or a dirt particle becoming lodged so as to prevent sealing, the rim 62 does not make sealing contact with valve seat 24, the plunger 48 will nevertheless achieve totally effective sealing.

On the other hand, if for any reason, such as a defective or broken spring 52, worn component or dirt particle becoming lodged in the sealing area, the conical tip 50 does not make sealing contact with the seat 24, the annular rim 62 will effect complete sealing, as shown in FIG. 2.

Upon energization of the coil 33, surrounding the housing 32, armature 42 is retracted into contact with the bottom of the shell 40 whereby spring 52 is further compressed. Continuing its retraction, the armature 42 then carries shell 40 and a closure member 54 until the shell bottoms against the inner surface of the housing 32 whereby spring 60 is compressed. The armature 42 thus moves a distance $c$ before engagement with the shell 40 and then the armature, shell and closure member 54 move together the distance a. To enable independent closure of the conical tip 50, the distance b is made somewhat greater than a and distance c is sufficient to permit opening of tip 50 by movement of armature 42 even though movement of shell 40 may be prevented for some reason. In addition, the spring 60 has substantially greater resilience than the spring 52 so that when the rim 62 and tip 50 are both engaged with seal 24, spring 52 will be compressed while the relationship b > a is maintained. Upon deenergization of the coil 33, plunger 48 and armature 42 carried thereby are returned to sealing position by expansion of spring 52. Closure member 54 is independently returned to its valve closing position by expansion of spring 60.

This invention thus provides a dual arrangement with wholly independent means for urging each of two discrete closure members into sealing engagement with a unitary valve seat. One system comprises spring 52 and plunger-armature 48–42, while the other comprises spring 60 and annular sealing rim 62. This independent movement of the two closure members into sealing engagement with the valve seat is accomplished even though a single armature 42 provides for opening movement of both closure members away from the valve seat.

Having thus described the invention, what is claimed is:

1. Dual sealing valve comprising a valve seat including an orifice with a sealing surface coaxial and coplanar with the upper stream edge of said orifice, first and second closure members axially movable toward and away from said valve seat, an armature movable in response to actuation of a solenoid coil to retract both said first and second closure members to unseat the same, means associated with each of said closure members independently urging each toward said valve seat, each closure member having a return stroke from its retracted position to sealing engagement with said orifice and sealing surface of sufficient extent to effect sealing of one independently of the other.

2. Dual sealing valve comprising a valve seat, a reciprocal armature with an energizable coil, a first reciprocable sealing member movable away from said valve seat in response to energization of said coil, a second reciprocable sealing member movable away from said valve seat in response to movement of said armature, each of said sealing members being independently movable coaxially toward said valve seat, and spring means independently urging each of said members toward sealing engagement with said valve seat, the coaxial movement of said sealing members toward and away from said valve seat being at least partially coextensive, said valve seat including a central orifice and a generally planar sealing surface coaxial therewith, one of said sealing members having a conical tip engageable within said orifice and the other sealing member including an annular rim coaxial with said conical tip and sealingly engageable with said planar surface about said orifice.

3. Dual sealing valve as set forth in claim 2 in which said second sealing member comprises a body of nonmagnetic material affixed in the open end of said shell, an axially extending central bore through said body, said first sealing member extending from said armature through said bore and terminating in a conical tip, said armature being axially spaced from said body a distance greater than the distance between the outer surface of said shell and the inner surface of said housing measured with said sealing members in sealing engagement with said valve seat.

4. Dual sealing valve comprising a valve seat, a reciprocal armature with an energizable coil, a first reciprocable sealing member movable away from said valve seat in response to energization of said coil, a second reciprocable sealing member movable away from said valve seat in response to movement of said armature, each of said sealing members being independently movable coaxially toward said valve seat, and spring means independently urging each of said members toward sealing engagement with said valve seat, the coaxial movement of said sealing members toward and away from said valve seat being at least partially coextensive, said armature being slidably disposed within a tubular shell of nonmagnetic material open at one end, a spring disposed within said shell and urging said armature toward said valve seat, said shell being slidably disposed with a tubular housing and a second spring urging said shell toward said valve seat, said second spring being of greater resilience than said first spring.

* * * * *